Sept. 26, 1944.    R. NEISES    2,359,238
HONEY FILTER
Filed Oct. 15, 1941
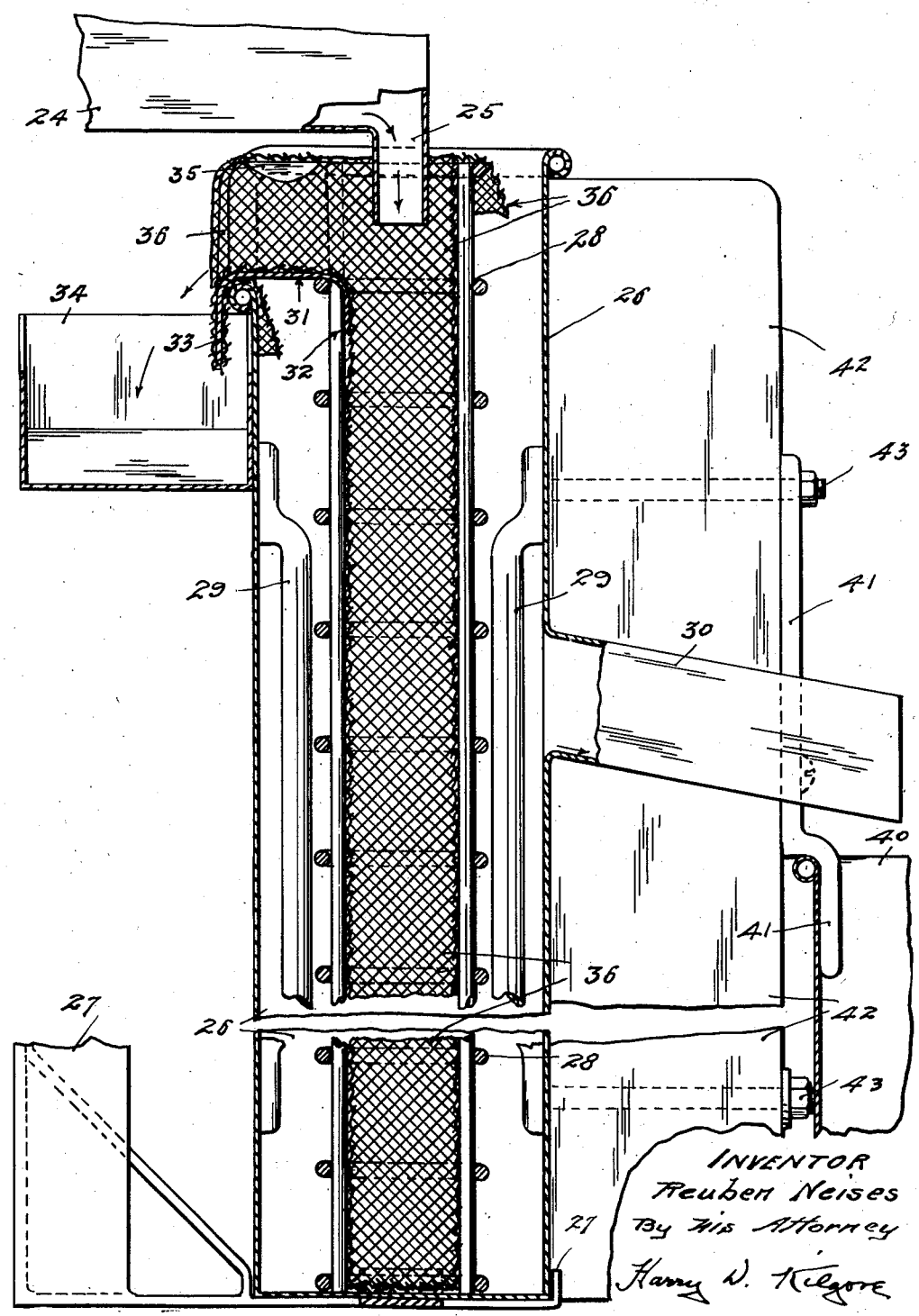
INVENTOR
Reuben Neises
By his Attorney
Harry N. Kilgore Patented Sept. 26, 1944

2,359,238

UNITED STATES PATENT OFFICE 2,359,238

HONEY FILTER

Reuben Neises, Winona, Minn.

Application October 15, 1941, Serial No. 415,057

10 Claims. (Cl. 210—149)

This invention relates to improvements in honey filters. My improved honey filter is preferably, but not necessarily, used in conjunction with a heater for heating honey, from an extractor, to reduce the viscosity and remove the larger particles and major portion of the broken honeycombs (wax) and foreign matter in the honey.

Certain objects of the invention are: first, to provide a filtered honey tank, a honey filter bag having a relatively large filtering area, and means for confining the bag in the tank to a relatively narrow transverse width to reduce the holding capacity thereof; second, to provide a honey filter having means for preventing an overflow of unfiltered honey into the filtered honey; third, to provide a honey filter having a novel overflow for the filtered honey that keeps the filtering surface active and relieves strain on the filter bag to prevent rupture thereof.

Other objects of the invention will be apparent from the following description, reference being had to the accompanying drawing.

To the above end, generally stated, the invention consists of the novel devices and combination of devices hereinafter described and defined in the claims.

Referring to the drawing:

The improved filtered honey tank, filter bag and associated parts are fragmentarily shown in a single view.

Honey from a heater, not shown, flows into a discharge trough 24 having on its outer end a depending spout section 25 from which honey is discharged into my improved honey filter.

The numeral 26 indicates a rectilinear filtered honey tank that is long, narrow and deep. This tank 26 is removably mounted on a supporting bracket 27. The tank 26 is supported on the bracket 27 under the discharge trough 24 with its spout 25 at the longitudinal and transverse center of said tank, with freedom for outward tilting movement for a purpose that will presently appear.

Removably mounted in the tank 26 is a mesh basket 28 that rests on the bottom of said tank. The tops of the tank 26 and the basket 28 are substantially in the same plane except the inner side of said tank which is downwardly offset, for a purpose which will presently appear. The basket 28 in horizontal cross-section has the same contour as the tank 26 and is spaced at its sides and ends therefrom. Vertical guide rods 29 on the sides of the tank 26 keep the basket 28 centered in said tank. As shown, the basket 28 is made up of vertical and horizontal rods connected at their points of intersection and spaced apart to form large mesh. A honey discharge spout 30 leads from the tank 26 near its top and longitudinal center.

An overflow apron 31 extends horizontally rearwardly over the offset rolled upper edge portion of the tank 26 and has on one of its longitudinal edges a depending member 32 that projects into the basket 28 close to the inner side thereof and is rigidly secured thereto. This apron 31 extends the full length of the basket 28 and has on its other longitudinal edge portion a depending member 33 that is spaced outwardly of the respective side of the tank 26. An overflow trough 34 is secured to the tank 26 on the inner side thereof and the apron member 32 extends into said trough. The trough 34 is inclined longitudinally thereof and its delivery end extends outwardly of the respective end of the tank 26. The overflow apron 31 is provided with upstanding end members 35 that extend to the top of the basket 28 which, as previously stated, extends slightly above the tank 26. The side of the basket 28 at the overflow apron 31 is open.

A filter bag 36 of cloth or any other suitable material is removably held suspended in the basket 28 and its mouth held open by folding the upper portion of said bag outwardly and downwardly over the basket 28, the apron end members 35 and the overflow apron 31. Said filter bag 36, at the apron 31, is also folded downwardly around the apron member 33 and inserted between the apron 31 and the rolled upper edge of the tank 26. The purpose of the overflow 31 and 34 is to prevent unfiltered honey in the bag 36 from mixing with the filtered honey in the tank 26 in case honey is delivered from the heater faster than it can be filtered and removed from the tank 26. A receptacle, not shown, will be placed under the delivery end of the overflow trough 34 to receive any overflow of honey therefrom.

To remove the filter bag 36 from the basket 28 or the basket 28 and the filter bag 36 from the tank 26, said tank is tilted on the bracket 27. Suitable means, not shown, may be provided for holding the tank 26 in its tilted position. A normally closed drain, not shown, may be provided for draining filtered honey from the tank 26 at the completion of any one filtering operation. It is important to note that when the tank 26 is in its tilted position, the overflow trough 34 is directly below the discharge spout 25 and will catch any honey that might drip from said spout. At the completion of any one honey filtering operation, the filtered honey remaining in the tank 26 may be drained therefrom and thereafter the basket 28 and the filter bag 36 may be lifted from the tank 26, when in its tilted position, for the purpose of cleansing the same or replacing an old filter bag with a new one.

The tank 26 may also be lifted from the bracket 27 to facilitate the cleansing of the same.

To facilitate the placing of a filter bag 36 in the basket 28, a spreader not shown in the form of a wire frame may be provided. The filter bag 36 has a large filtering area and by confining the same in a narrow transverse space, in the tank 26 by means of the basket 28, the holding capacity thereof is materially reduced. Removal of the larger particles of wax and foreign matter from the honey before the same enters the filter, makes it unnecessary to change the filter bag 36 often. It is, of course, evident that the improved filter may be used independently of the heater and in which case unfiltered honey will be poured into the filter bag 36, from a pail or otherwise. By locating the discharge spout 30 near the top of the tank 26, the movement of honey in said tank keeps the filtering surface of the filter bag 36 active. The location of the discharge spout 30 near the top of the tank 26 performs another important function, to wit: it keeps the major portion of the filter bag 36 submerged in the honey in said tank and thereby relieves said bag from the pressure of honey therein and hence prevents easy rupture thereof.

Filtered honey in the tank 26 overflows into the spout 30 and is discharged therefrom into a receptacle 40. The tank 26, as shown, is supported in part from the receptacle 40 by a pair of hook-like members 41 secured to upright wooden bars 42 secured by bolts 43 to the tank 26. When the improved filter is used independently of the heater, the same is supported by the hook-like members 41 on the receptacle 40. Another important reason for locating the discharge spout 30 near the top of the tank 26 is that when said tank is supported on the receptacle 40 independently of a heater, it is held by the hook-like members 41 in a low position that makes it easy to pour honey into the filter bag 36 by means of a pail.

The drawing illustrates a commercial form of the invention, but it will be understood that the same is capable of certain modifications as to details of construction, arrangement and combination of parts within the scope of the invention herein disclosed.

What I claim is:

1. In a liquid filter, a tank, a mesh basket in the tank, an open mouth filter bag in the basket, an overflow receptacle on the tank, and an overflow apron on the basket below the top thereof arranged to discharge into said receptacle, said bag at its open mouth being folded outwardly and downwardly over the apron, said tank having an outlet for the filtered liquid.

2. In a liquid filter, a support, a tank movably mounted on the support, a mesh basket in the tank, an open mouth filter bag in the basket, an overflow receptacle on the tank, an overflow apron on the basket arranged to discharge into said receptacle, said bag at its open mouth being folded outwardly over the apron and a discharge spout arranged to discharge into the open mouth of the bag, said tank being free for movement on the support to remove its upper end from under said spout and position the overflow receptacle under the discharge spout, said tank having an outlet for the filtered liquid.

3. In a liquid filter, a tank, a mesh basket in the tank, an open mouth filter bag in the basket, an overflow receptacle on the tank, and an overflow apron on the basket below the top thereof and arranged to discharge into said receptacle, the filter bag at its open mouth being folded outwardly over the top of the basket except at the apron where the same is folded outwardly and downwardly thereon, said tank having an outlet for the filtered liquid.

4. In a liquid filter, a wide, deep and narrow rectilinear open top tank, a mesh basket open at its top and bottom and loosely resting on the bottom of the tank and having substantially the same transverse contour, means holding the basket at its sides spaced from the sides of the tank, an open mouth filter bag removably held in the basket and loosely resting on the bottom of the tank, a discharge spout leading from the tank near the top thereof, an overflow receptacle on the tank, and an overflow apron on the basket below the top thereof and arranged to discharge into said receptacle, the filter bag at its open mouth being folded outwardly over the basket except at said apron where the same is folded outwardly and downwardly thereon.

5. In a liquid filter, a tank, a narrow rectilinear mesh basket in the tank, a receptacle on the tank, the front member of the basket being below the back and side members thereof to afford an overflow passageway, an apron leading from said passageway and arranged to discharge into the receptacle, and an open mouth filter bag in the basket, said bag at its open mouth being folded outwardly over the top of the basket except at the apron where the same is folded outwardly and downwardly thereon, said tank having an outlet for the filtered liquid.

6. The structure defined in claim 5, further including a depending member on the outer end of the apron, said bag being further folded around said depending member and between the apron and the upper edge of the tank.

7. In a liquid filter, a tank, a mesh basket in the tank, and an open mouth filter bag in the basket folded at its mouth to afford a restricted overflow extending outwardly of the tank, said tank having an outlet for the filtered liquid below said overflow and materially above the bottom of the tank.

8. The structure defined in claim 7 further including a normally closed drain in the bottom portion of the tank.

9. In a liquid filter, a tank having an outlet for the filtered liquid near its upper end portion, a mesh basket in the tank, an overflow receptacle, an open mouth filter bag in the basket folded at its mouth to afford a restricted overflow arranged to discharge into the receptacle, and means for conveying liquid from a source of supply, said tank and conveying means being relatively movable, whereby the liquid from said conveying means will be discharged either into the bag or the overflow receptacle.

10. In a liquid filter, a wide rectilinear tank that is relatively narrow and having an outlet near its upper end, a mesh basket in the tank horizontally spaced therefrom, the walls of the tank and basket being substantially parallel, and an open mouth filter bag in the basket folded at its mouth to afford a restricted overflow extending outwardly of the tank.

REUBEN NEISES.